Nov. 19, 1968  K. H. BURGIN  3,411,280
CITRUS FRUIT PICKER
Filed June 9, 1966  3 Sheets-Sheet 1
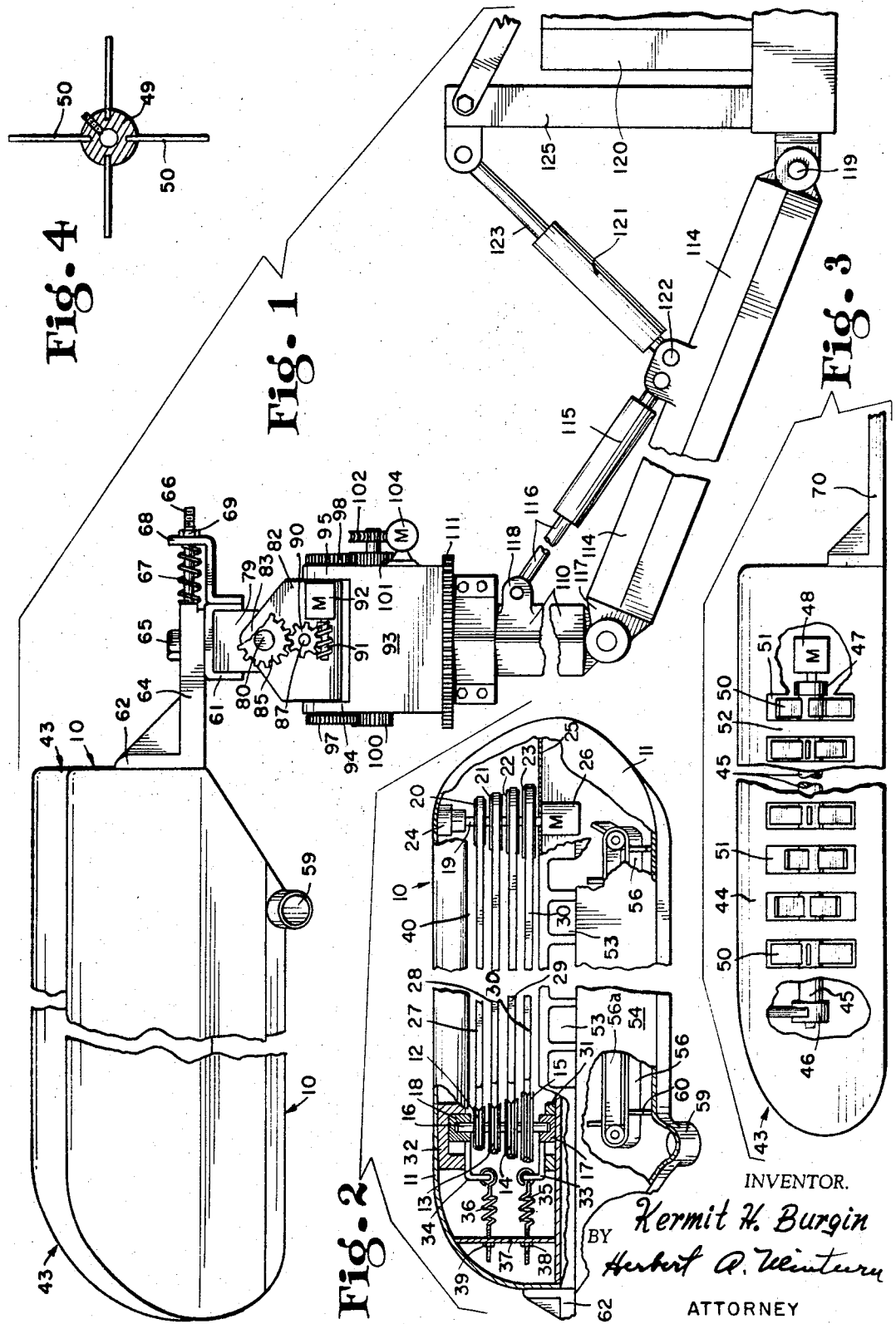
INVENTOR.
Kermit H. Burgin
BY Herbert A. Winters
ATTORNEY Nov. 19, 1968    K. H. BURGIN    3,411,280
CITRUS FRUIT PICKER
Filed June 9, 1966    3 Sheets-Sheet 2
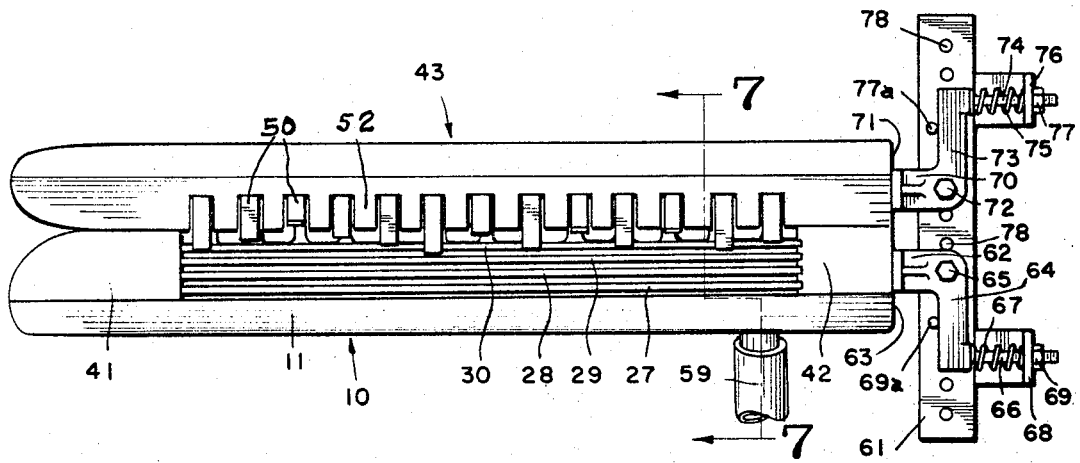
Fig. 5
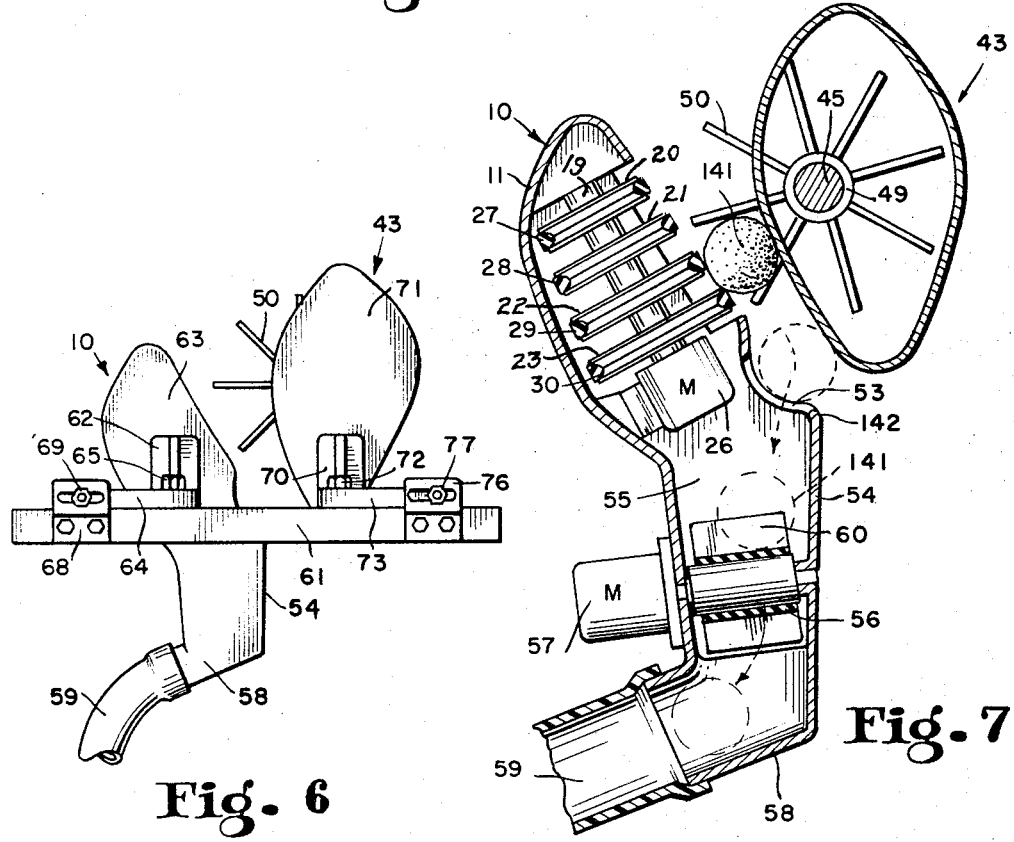
Fig. 6
Fig. 7
INVENTOR.
Kermit H. Burgin
BY
Herbert A. Weintraub
ATTORNEY Nov. 19, 1968  K. H. BURGIN  3,411,280
CITRUS FRUIT PICKER
Filed June 9, 1966  3 Sheets-Sheet 3

INVENTOR.
Kermit H. Burgin
BY
Herbert A. Minturn
ATTORNEY

United States Patent Office 3,411,280
Patented Nov. 19, 1968

3,411,280
CITRUS FRUIT PICKER
Kermit H. Burgin, Box 212, R.R. 1,
Whitestown, Ind. 46075
Filed June 9, 1966, Ser. No. 556,317
10 Claims. (Cl. 56—328)

ABSTRACT OF THE DISCLOSURE

A structure having an up and down passageway therethrough open at both top and bottom; a flight of at least one belt exposed to travel transversely across a side of the passageway; a fruit discharge through a side of the passageway below said belt flight; and means engaging and conveying branches of a tree downwardly through said passageway passed said belt flight, across said fruit discharge opening, and out through said passageway bottom opening, permitting said structure to be operated in vertical travel through the tree.

---

This invention is that of a device for picking citrus fruit such as oranges, grapefruit and lemons from trees upon which they grow. Due to the present labor situation involving inability to enlist sufficient native pickers and restrictions upon importing pickers, it becomes necessary to device mechanical means to keep the citrus industry alive.

The invention herein illustrated and described is presented to solve the picker problem.

Orange trees, for example, are many branched and have thorns along the branches. When oranges are ready to be picked, the trees have blossoms and immature oranges interspersed with the mature oranges. The branches carry oranges in clumps as well as in widely spaced relation. The blossoms and immature oranges should not be removed or damaged in the picking of the mature oranges.

An orange should not be picked from a branch simply by pulling on it. To do so may result in damaging the end of the central pithy core in turn permitting deterioration of the orange. Oranges, when picked by hand are given a twist simultaneously with a pull, which action avoids that deterioration possibility. To achieve that action has been the great problem in developing a successful mechanical picking machine.

In the present invention, that problem is met in general by providing in its simplest form a pair of co-operating, elongated jaws. One jaw carries a plurality of side-by-side flights of flexible belts along its side opposing the other jaw. The other jaw carries a plurality of flexible arms or paddles having end portions moving downwardly, transversely of travel of the side-by-side belts. The jaws are directed by outer ends toward the tree; moved inwardly; and carried upwardly generally horizontally to have branches received between the jaws and traversed to be left thereunder.

The jaws are spaced one from the other to taper from wide spacing at the tops to narrower spacing at the bottoms. Oranges on the branches coming between the jaws bear against the series of belt flights moving in a common direction and the paddles come downwardly upon the oranges which are rotating somewhat, to apply a down-push during that rotation to effect the picking. Separated oranges drop into an elongated chamber onto a belt which in turn carries the oranges to a discharge opening from which they may be conveyed to suitable transporting means. The branches, under the down travel of the paddles, are urged from between the jaws, particularly as the jaws may in unison be elevated through the tree.

The means for carrying out this invention will be more fully described in reference to the accompanying drawings, in which FIG. 1 is a diagrammatic view in side elevation of a structure embodying the invention in a form adapted to be mounted upon a tractor;

FIG. 2 is a view in vertical elevation with portions broken away of an inner face of a jaw from which flights of belts are exposed and with the rear end at the left;

FIG. 3 is a view in vertical elevation with portions broken away of a face of a second jaw from which extend transversely a plurality of rotating paddles, this face being in opposition to the face of the belt carrying jaw;

FIG. 4 is an enlarged view in transverse vertical elevation through a shaft carrying the paddles;

FIG. 5 is a view in top plan of the jaws in operative positions;

FIG. 6 is a view in a slightly enlarged scale of the rear ends of the jaws as mounted in relation to each other;

FIG. 7 is an enlarged vertical, transverse sectional view on the line 7—7 in FIG. 5;

Figure 8:
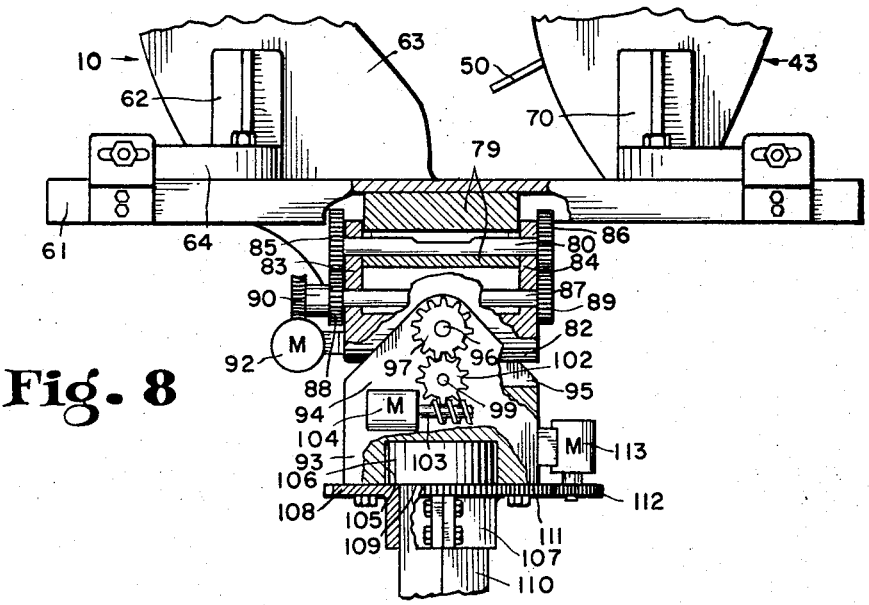
FIG. 8 is a fragmentary rear elevational view in partial section on an enlarged scale of a universal shifting head carrying the two jaws.

A jaw generally designated by the numeral 10 is outwardly defined by a metal shell 11 to form a hollow body within which there is a plurality of pulleys herein shown as four in number and designated by the numerals 12, 13, 14, and 15, all fixed to a shaft 16 rotatably carried by end portions in bottom and top bearings 17 and 18. These bearings are located with the bearings 18 inside the shell 11 and adjacent its top, with the lower bearing 17 spaced therefrom in accordance with the length of the shaft 16. The pulleys 12, 13, 14, and 15 are mounted to be closely spaced along the shaft 16 which is adjacent the rear end of the shell 11.

Near the front end of the shell 11 is a shaft 19, parallel to the shaft 16. Pulleys 20, 21, 22, and 23 are fixedly mounted on the shaft 19. The diameters of these pulleys are the same respectively as are those of the pulleys 12, 13, 14, and 15. The upper end of the shaft 19 is carried by a bearing 24 adjacent the shell top, FIG. 2, and the lower end of the shaft 19 extends through a plate 25 and is fixed thereunder to a hydraulic motor 26.

The diameters of pulleys 12 and 20; 13 and 21; 14 and 22; and 15 and 23 vary from a small diameter to a large diameter, the smaller diameter pulleys being at upper portions of their shafts 16 and 19. Endless belts 27, 28, 29, and 30 entrain respectively the pulley pairs 12, 20; 13, 21; 14, 22; and 15, 23. The belt flights are closely spaced one from the other, such, for example, as approximately one inch, but this spacing may be greater.

The bearings 17 and 18 are horizontally shiftable within limiting blocks 31 and 32 to permit the shaft 16 being variably spaced from the shaft 19 by means varying the tension in the belts. Any suitable means may be employed to effect this shifting. For example, the bearings 17 and 18 may have arms 33 and 34 fixed thereto to extend forwardly and have ends of springs 35 and 36 engaged therewith. These springs extend through a vertical member 37 to have adjusting nuts 38 and 39 screw-threadedly engaging them to increase or decrease the spring tensions.

The belts 27, 28, 29, and 30 have flights in common exposed through an elongated window 40 in the shell 11 on what will be termed the inner face of the shell 11. The horizontal length of this window may vary. Preferably, it will be approximately thirty to thirty-six inches. End portions 41 and 42 of the shell cover the pulleys so as to leave exposed through the window straight lengths only of the belts, FIG. 5.

The jaw shell 11 extends below the window 40 and is provided with a plurality of side-by-side openings 53 therethrough sufficiently large to let a citrus fruit pass therethrough. This portion of the shell 11 carrying these openings 53 is preferably concave along its length and merges into an approximately vertical wall 54 forming a side closure to a chamber 55 over the top of which the openings 53 extend.

A conveyor belt 56 extends approximately throughout the length of this chamber 55 and is driven by a hydraulic motor 57 to have its top flight 56a terminate over a discharge funnel-like fruit receiving zone 58 opening into a discharge conveyor hose or tube 59. Members 60 are fixed to the belt 56 at spaced intervals as positive means for carrying the fruit along with the belt.

A second jaw, generally designated by the numeral 43, has a metal shell 44 within which is a rotatable shaft 45 extending longitudinally therethrough, FIG. 3, from a forward bearing 46 rearwardly to a bearing 47 and to a hydraulic motor 48. A number of paddle wheels 49 are mounted along and drivingly fixed to the shaft. The wheels are preferably identical in that each has four flexible arms or paddles 50. The paddles are angularly spaced one in relation to those of adjacent wheels, with the paddles of each wheel circumferentially spaced ninety degrees apart, FIGS. 3 and 4. The paddles 50 are made of a flxible material such as one example, of a rubber impregnated canvas.

The outermost surfaces of the belts 27, 28, 29 and 30 as presented at the window 40, lie normally in a plane inclined from the bottom of the window to its top outwardly from the jaw 43, FIG. 6. The surface of the jaw 43 through openings 51 of which the paddles 50 travel, formed by the intervening strips 52 a convex surface bowing from the top of the jaw downwardly and toward the belts and thence away therefrom.

The shell 43 is provided with vertically extending windows 51 spaced apart by intervening bands 52 of the shell. The shaft 45 is spaced within the shell 43 adjacent its side, FIG. 7, in which are the windows 51 and the wheels 49 are spaced along the shaft 45 to permit their paddles 50 to pass outwardly and inwardly through the windows by lengths as the shaft 45 rotates.

A picking unit comprises one jaw 10 and one jaw 43 mounted upon a carrier member, herein shown as a length of a channel iron 61, FIG. 5 with the belt face of jaw 10 opposite the paddle-window side of the jaw 43.

In one such mounting, a bracket 62 is secured to the back end face 63 of the jaw 10, FIGS. 1, 5 and 8, and has a foot 64 extending rearwardly to rest on the iron 61 and be horizontally swingably secured thereto by any suitable means such as a bolt 65. The foot 64 extends along the iron 61 as a lever and carries a rearwardly extending rod 66. A coil spring 67 surrounds the rod 66 and bears by its ends between the foot 64 and a stop member 68 fixed to the iron 61. A nut 69 screw-threadedly engages an end of the rod 66 extending through the stop 68 as a means for compressing the spring 67. A stop 69a is fixed to the iron 61 and extends vertically on the forward side of the foot 64 as means to limit travel of the jaw 10, as viewed in FIG. 5, to a right angle position with the iron 61.

The jaw 43 is horizontally, swingably mounted on the channel iron 61 by means of a bracket 70 fixed to the rear end face 71 of the jaw 43 and a bolt 72 passing through the bracket 70 and the iron 61. An arm 73, part of the bracket 70, extends along the iron 61 in a direction opposite to that of the arm 64 and carries a rod 74. A coil spring 75 surrounds the rod 74 and bears by its ends between the arm 73 and the front side of a member 76. The rod 74 extends through the member 76 and screw-threadedly carries a nut 77 bearing against the back side of the member 76. A stop 77a is fixed to the iron 61 to extend upwardly on the front side of the arm 73 as a clockwise swinging limit, FIG. 5, of the jaw 43. The stops 69a and 77a limit the swinging of the jaws 10 nad 43 toward each other to positions of substantial parallelism. The jaws 10 and 43 may swing apart in opposite to the springs 67 and 75 upon sufficient pressure between the jaws being applied thereto.

The jaws 10 and 43, as indicated in FIG. 5, are of approximately equal height and are positioned to have the exposed belt face directed toward the exposed paddle face of the respective jaws 10 and 43. The spacing apart of the jaws, FIG. 6, is determined by the selected positions of the pivot bolts 65 and 72 along the iron 61 which is provided with spaced apart holes 78 through which the bolts may pass. The spacing of the jaws is determined by the size of the fruit to be picked. For grapefruit, the spacing will exceed that for oranges, and for oranges, will exceed that for lemons, which will later be explained.

The channel iron 61 has a block 79 extending downwardly from its underside. A shaft 80 extends horizontally through the block 79 longitudinally in parallelism with the iron 61, FIGS. 1 and 8. The shaft 80 extends by ends from opposite sides of the block 79 and is fixed thereto against rotation. A yoke 82 has a pair of upturned arms 83 and 84 straddling the ends of the block 79, and rockably carried on the ends of the shaft 80. The shaft 80 extends beyond the arms 83 and 84 and carries on each of its ends a gear 85 and 86 respectively fixed in each instance to the shaft 80.

The yoke 82 carries a shaft 87 thereacross, below and in parallelism with the shaft 80. This shaft 87 is rotatable through the yoke arms 83, 84 and etxends therefrom to carry a gear 88 on one end and a gear 89 on the other end, these gears being in constant mesh respectively with the gears 85 and 86. A worm wheel 90 is fixed to the shaft 87 and is in mesh with a worm 91 driven by a hydraulic motor 92 mounted on the yoke 82.

A swivel head 93 has a pair of spaced apart upturned arms 94 and 95 straddling the lower part of the yoke 82 with the planes of the arms 94 and 95 at ninety degrees from the planes of the yoke arms 83 and 84. The head arms 94 and 94 are rockably carried on outer ends of a shaft 96 which extends through the yoke 82, fixed thereto and at a right angle to the shaft 98. Also fixed to the shaft 96 is a gear 97 and 98 at respective shaft ends.

The head 93 carries a rotatable shaft 99, on the outer ends of which are fixed respectively gears 100 and 101 in constant mesh with the gears 97 and 98, FIG. 1. A worm wheel 102 is also fixed to an end of the shaft 99. A worm 103 is in constant mesh with the worm wheel 102. The worm is driven by a hydraulic motor 104 mounted on the the head 93. The head 93 is provided with a cylindrical socket 105 entering from its underside and receiving therein a cylindrical bearing 106. The head 93 is horizontally, rotatably retained on the bearing 106 by any suitable means such as by a clamp 107 having a radial portion 108 removably bolted against the underside of the head and fitting under a shoulder 109 around the underside of the bearing 106. The bearing 106 is carried in fixed manner on the top end of a mast 110, FIG. 8. The radial portion 108 has a toothed periphery forming a spur gear 111. A gear 112 is in constant mesh with the gear 111 and is driven by a hydraulic motor 113.

The mast 110 is hinged to an end portion 117 of a boom 114. A hydraulic cylinder 115 is hinged by one end to the boom and by a piston member 116 extending from the other end of the cylinder 115 to the mast 110 at a zone 118 spaced from the hinged end. The boom 114 is hinged as at 119 to a tractor 120. A hydraulic cylinder 121 is hingedly connected to the boom 114 as at 122, and by an end portion of a piston member 123 extending from the cylinder 121 to an upper end of a post 125.

*Operation*

In order to simplify the description of the operation of the structure of the invention herein, it is assumed that the tractor 120 has been brought up to a tree from which oranges are to be picked; that the boom 114 has been lowered to extend longitudinally ahead of the tractor; that the mast 110 is approximately vertically disposed; and that the head 93 has been positioned to locate the jaws 10 and 43 in approximate longitudinal alignment with the boom.

Figure 10:
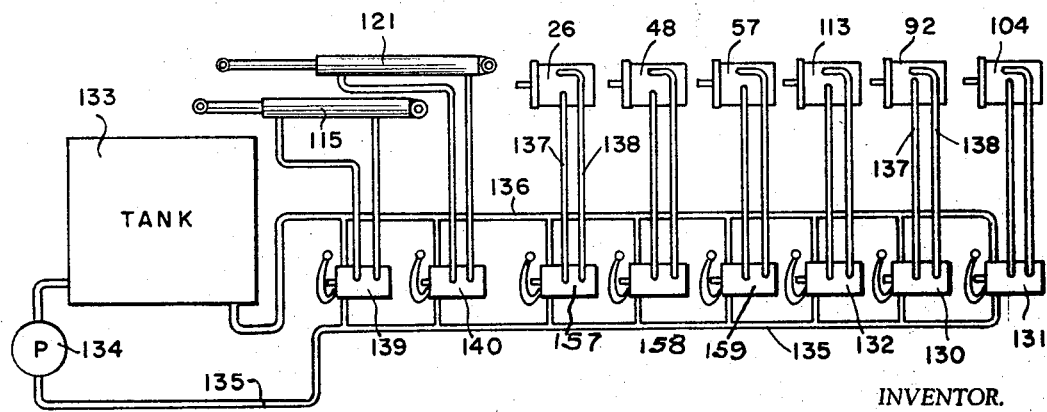
FIG. 10 is a schematic diagram of the hydraulic operating system.

The jaws 10 and 43 are brought up under the lowermost branches of the tree which carry oranges. In so doing, the motor 92 which effects vertical rocking of the jaws, and the motor 104 which effects lateral rocking are actuated by their control valves 130 and 131. FIG. 10, to achieve the most effective approach of the jaws. Also, the motor 113 which effects rotation of the head 93, may be actuated by the valve 132. All of these movements are possible to steer the jaws along and past heavy branches of the tree.

Referring to FIG. 10, the hydraulic system comprises an oil storage tank 133 from which a pump 134 receives oil and sends it under pressure through the pipe or tube 135 to the valves 130, 131, and 132 above mentioned and additional valves later referred to. A return tube 136 carries oil from the valves back to the tank 133. Each of the hydraulic motors is connected to its control valve by a pressure tube 137 and a return tube 138. All of this arrangement is standard and well known procedure. The motors and the valves are commercially obtainable and hence are not described in detail as to internal structure.

Continuing with the operation, the hydraulic cylinders 115 and 121 are actuated through their control valves 139 and 140 to bring the jaws 10 and 43 upwardly through the tree. In so doing, branches (not shown) are received between the jaws and discharged from therebetween from the undersides thereof. As these branches relatively pass between the jaws, oranges thereon come into contact with the belts 27, 28, 29, and 30. These belts by their exposed flights are travelling in common directions from the zone at the outer end of the jaw 10 toward the inner zone thereof adjacent the support channel iron 61. The jaws 10 and 43 have a length sufficiently long to reach inwardly of the tree branches to bring the oranges thereon to between the jaws without causing the outer ends of those branches to reach and drag over the iron 61.

The belts are so arranged, FIG. 6, that they define a wider spacing at the entrance to between the jaws than exists between the last, lower belt 30. This causes the orange 141, FIG. 7, shown as an example, to be brought against the stationary bands 52 of the jaw 43, while still being in contact with and being rotated by the belts, particularly the lower belts 29 and 30. A further feature is that the lineal speed of the belts increases from the belt 27 to belt 30 which has the highest speed. This speed is relatively low, but may be varied by the speed of the hydraulic motor 57 which lends itself admirably for providing the selected rate of belt travel. This rate may, without imposing any limitation thereto, be as low as around two feet per second. It is desirable that the belt speeds are within a range which do not set up any appreciable slippage between the belts and the orange skin. The increasing speeds from belt to belt increase the effective gripping of the orange as the jaws are lifted through the tree.

The weight of the oranges and of their carrying branches will cause the oranges to bear compressibly against the belts. By reason of their lengths, these belts will desirably be caused to sag between their end pulleys, and the degree of sag is controlled by the degree of tension set up in the springs 35 and 36. This sagging will provide a greater length of belt contact with the orange than would be had with belts tensioned to straight line condition.

The paddles 50 travelling downwardly tend to move the tree branches and oranges downwardly across the belts. The branches, being attached to the tree trunk, yieldingly resist this relative downward travel. This resistance aids these paddles in exerting a downward push on the oranges to separate them while rotating from those branches. In so doing, that fundamental action of simultaneously pulling and rotating the orange is achieved. The paddles 50 are sufficiently flexible to cause no damage to the orange, and on the other hand, aid in carrying the branches on below the jaws 10 and 43.

The jaws 10 and 43 present a widened zone therealong and therebetween immediately below the belt 30. FIG. 7, but this zone has an opening therealong between the lower end of the jaw 43 and a lip 142 slightly less than the diameter of the oranges to be picked. The jaw 10 is provided with the plurality of closely spaced openings 53, through which the oranges may drop. The spacing between the lip 142 and the jaw 43 is adjustably had by suitable spacing apart the brackets 62 and 70 along the iron 61.

Oranges, in dropping through the openings 53, fall onto the moving conveyor belt 56, the upper flight of which moves toward the inner end of the jaw 10. At this inner end, the oranges will roll off the belt 56 and drop into the depressed zone 58. From that zone, the oranges will roll under the influence of gravity into the connecting flexible tube 59, down which the oranges may fall with retarding frictional resistance to containers (not shown).

The jaws 10 and 43, may either one or both spring apart from the other should more branches than can be accommodated be entered between the jaws to allow the branches to become disengaged, whereupon the jaws may re-assume their normal picking positions. Adjustments of the springs 67 and 75 will be made so that this spreading apart of the jaws will only occur under extreme pressure therebetween. This spreading apart is normally avoided by the operator guiding the jaws to avoid bringing the heavier, more rigid portions of branches between the jaws.

The picking will proceed by valve manipulation to lower the jaws to carry them upwardly again through the tree at a circumferentially spaced position. The jaws may at times be lowered by their outer free ends so as to place the jaws in positions inclined upwardly from those free ends. In this case, oranges may be picked as before. Oranges dropped onto the belt 56 will then be elevated to the zone 58 by reason of the presence of the members 60 which prevent the oranges from rolling back down the belt 56. In the manipulation of the picker, the jaws should as far as possible be elevated in approximate parallelism with the oranges, which will be in positions mostly radial of the tree trunk. Several "passes" of the jaws up through the tree may be usually had at one position of the tractor, due to the universal mounting of the head 93 on the mast 110 of the boom 114.

Figure 9:
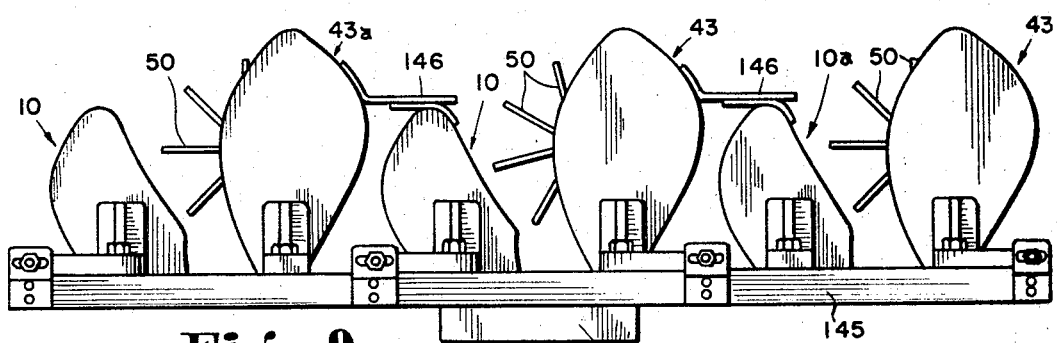
FIG. 9 is a view in rear elevation similar to that of FIG. 6, but showing the mounting of three sets of jaws in place of but the one set.

The foregoing description of the picker has been made in reference to the use of a single pair of jaws 10 and 43. It is possible to employ a multiple number of pairs of jaws operating in the same manner as above described. Reference is made to FIG. 9 where, for example, three pairs of jaws are shown mounted on a single supporting structural member 145. In this mounting, expansible shielding 146 is employed between adjacent jaw pairs to direct branches to between the jaws in the pairs. In order that the pairs be mounted close together, the jaws 43a and 10a are fixedly mounted on the member 145 while the other jaws of those outer pairs are swingably mounted.

Additional valves 147, 148 and 149 are employed to control operation of the motors 26, 48 and 159.

It is obvious that many structural deviations in the above described one form of the invention may be had without departing from the spirit of the invention. I therefore do not desire to be limited to that precise form beyond the limitations which may be imposed by the following claims.

I claim:

1. A device for picking fruit from branches of trees, comprising
   a pair of jaws comprising first and second jaws;
   means mounting the jaws each by an adjacent end to have the jaws extend with opposing sides longitudinally from their mounting to outer free ends with a predetermined degree of lateral spacing apart;

belt means longitudinally traversing said first jaw opposing side;

a plurality of paddles rotatably carried by and extending by end portions from the opposing side of said second jaw to travel cross-wise of said belt means; and means elevating and lowering said mounting means among the branches of the trees.

2. The structure of claim 1, in which there is pulley means adjacent each end of said first jaw and around which said belt means is trained; and said pulleys being mounted to cause said belt means to slope in relation to said second jaw outwardly and upwardly defining a wider opening between said opposing sides at upper edge portions than at lower portions.

3. The structure of claim 1, in which said second jaw opposing side has up and down windows therethrough with portions of the jaw therebetween;

said paddles having an axis of rotation located back of said side; and said paddles travel by end portions through said windows toward and away from said belt means.

4. The structure of claim 1, in which said belt means comprises a plurality of individual belts varying in length from top to bottom of said first jaw; and pulleys at each end of said first jaw, graduated in size to provide varying belt speeds.

5. The structure of claim 1, in which said jaws at a lower zone are limited in spacing apart to restrain said fruit from passing therebeyond, but are open therebelow to allow branches to pass therebeyond; and a chamber below said belt means;

said first jaw having fruit size openings from below the belt means into said chamber;

said opening being located at said lower zone.

6. The structure of claim 1, in which said mounting means yieldingly permits said jaws to swing apart one from the other under subjection to a predetermined excess pressure induced therebetween by branches in passing between the jaws.

7. The structure of claim 1, in which there is a head;

a supporting member on which the head is rotatably carried;

means for rotating the head;

a yoke member carried by said head rockable on an axis approximately at ninety degrees to the axis of the head rotation;

means rocking said yoke in relation to said head;

said yoke member carrying said mounting means for rocking on an axis approximately ninety degrees circumferentially of the axis rocking of the yoke member in relation to said head; and means for rocking the mounting means in relation to said yoke.

8. The structure of claim 1, in which there is means for varying the degree of sag of said belt means under pressure of said fruit thereagainst.

9. The structure of claim 5, in which there is conveyor means in said chamber characterized by conveying fruit dropped into the chamber from the outer portion of the first jaw to the mounting end thereof regardless of tilt of the jaw; and a funneling zone at said first jaw mounting end receiving fruit from said conveyor means; and fruit discharging means connecting with said zone.

10. For picking fruit from branches of a tree, apparatus having a passageway therethrough open at both top and bottom; a belt having a flight traversing a side of said passageway; a fruit discharge opening from a side of said passageway below said belt flight allowing the fruit to leave laterally of the passageway; and means separated from said flight movable generally from top to bottom of the passageway across the belt flight; said means urging the tree branches out said bottom opening.

References Cited

UNITED STATES PATENTS

| 2,698,508 | 1/1955 | Hollister | 56—332 |
| 2,968,141 | 1/1961 | McGough | 56—332 |
| 3,143,844 | 8/1964 | Polk | 56—328 |
| 3,161,007 | 12/1964 | Bergquist | 56—332 |
| 3,197,952 | 8/1965 | Lasswell | 56—328 |

RUSSELL R. KINSEY, *Primary Examiner.*